(No Model.) 2 Sheets—Sheet 1.

W. HUMANS.
PERMANENT MAGNET FOR ELECTRICAL APPARATUS.

No. 375,749. Patented Jan. 3, 1888.

WITNESSES:
Chas. S. Gooding.
John R. Snow.

INVENTOR:
William Humans,
by J. E. Maynader
Atty

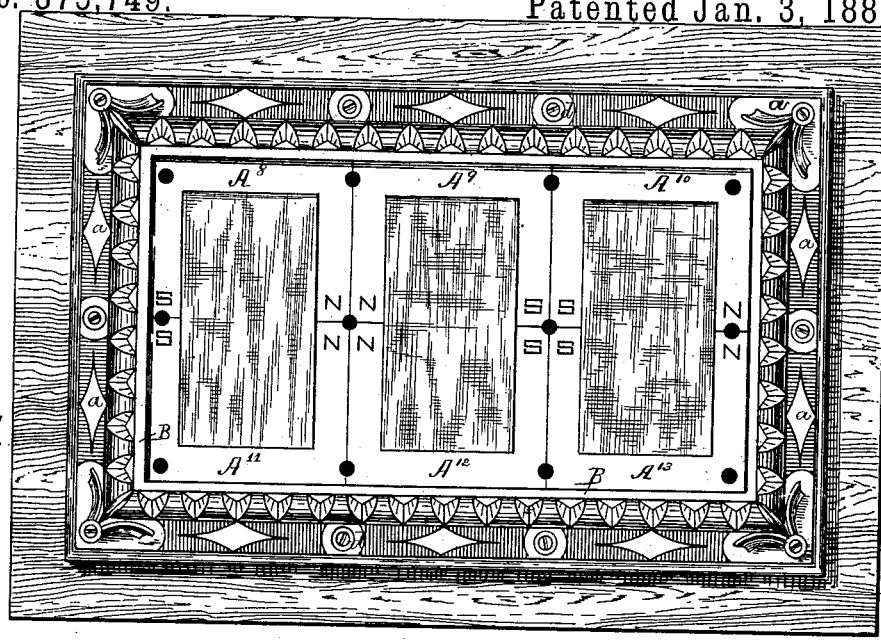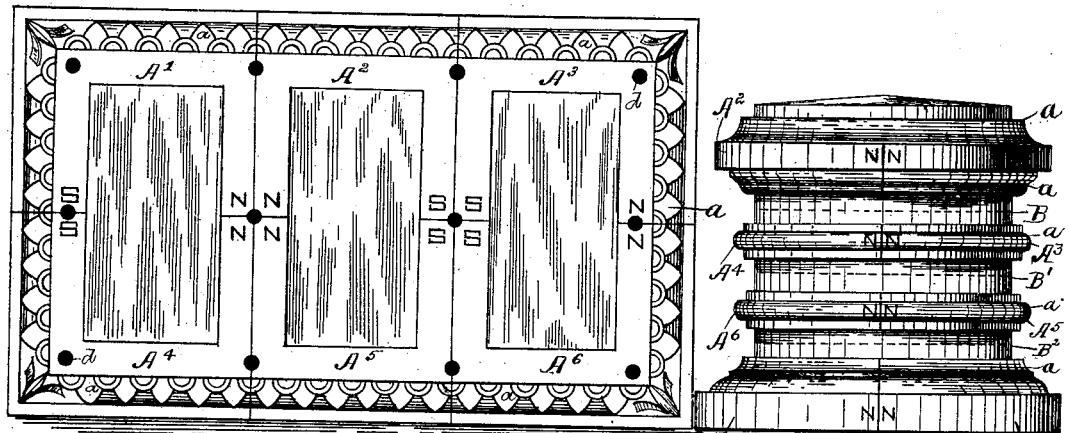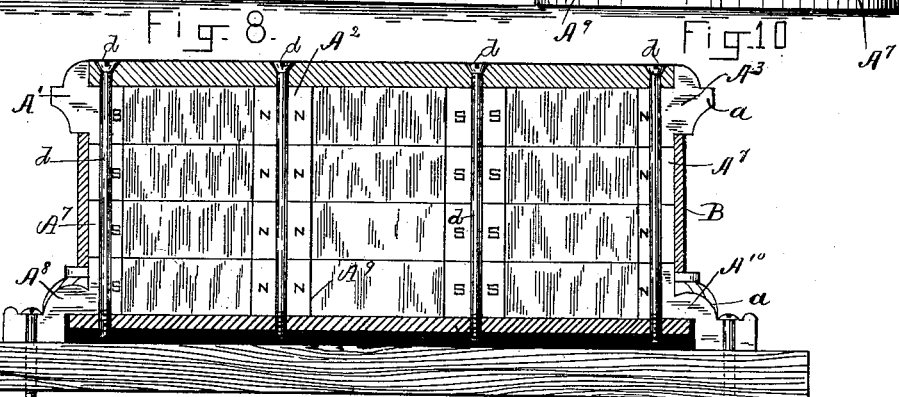

UNITED STATES PATENT OFFICE.

WILLIAM HUMANS, OF CAMBRIDGE, MASSACHUSETTS, ASSIGNOR TO THE AMERICAN MAGNETIC ELECTRIC COMPANY, OF JERSEY CITY, NEW JERSEY.

PERMANENT MAGNET FOR ELECTRICAL APPARATUS.

SPECIFICATION forming part of Letters Patent No. 375,749, dated January 3, 1888.

Application filed July 23, 1885. Serial No. 172,432. (No model.)

*To all whom it may concern:*

Be it known that I, WILLIAM HUMANS, a citizen of the Dominion of Canada, residing at Cambridge, in the county of Middlesex, State of Massachusetts, have invented a new and useful Permanent Magnet for Electrical Apparatus, of which the following is a specification, reference being had to the accompanying drawings, making a part hereof, in which—

Figure 1:
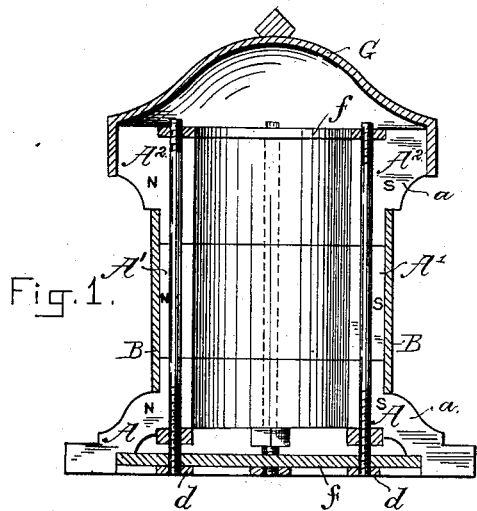
Figure 2:
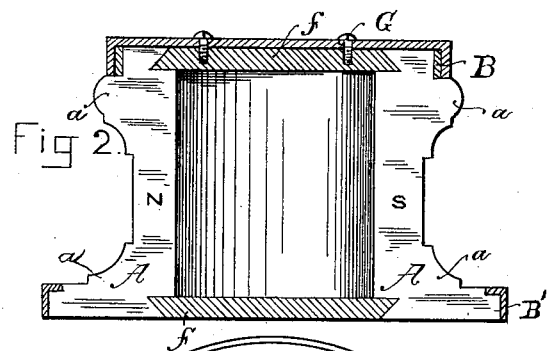
Figure 3:
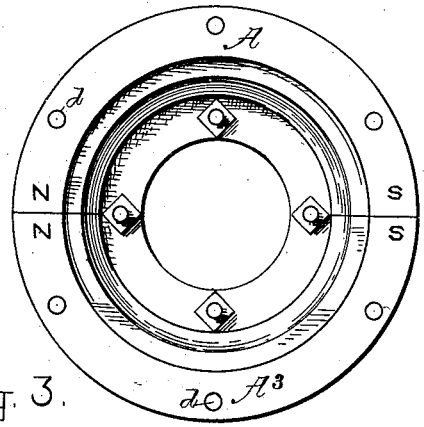
Figure 4:
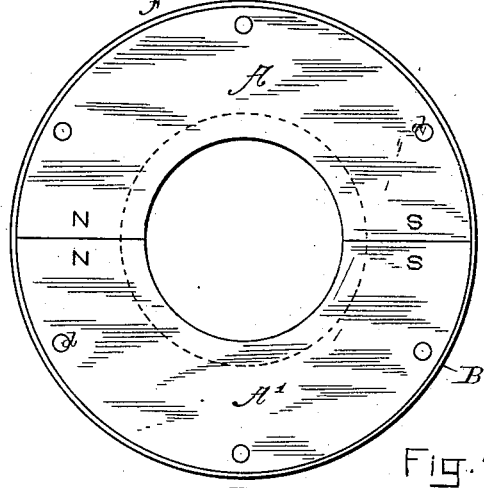
Figure 5:
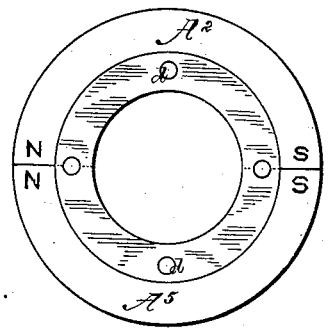
Figure 6:
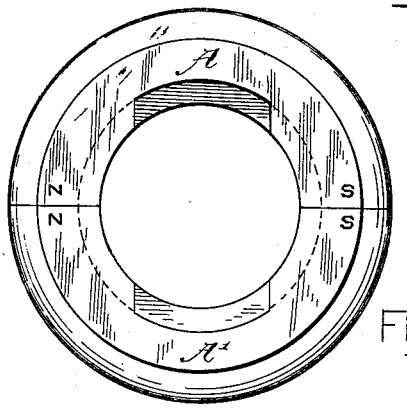

Figure 1 is a section, Fig. 3 a bottom plan, and Fig. 5 a plan, of a box or case consisting mainly of six permanent magnets, the magnets being bolted together in threes, each set forming a semi-cylindrical portion, so that when the two sets are secured together they will form a compound magnet in the form of a cylindrical box or case, the two sets of magnets being connected by a hoop. Fig. 2 is a section, Fig. 4 a bottom plan, and Fig. 6 a plan, of a box or case formed mainly of a pair of magnets held together by hoops. Figs. 7, 8, and 9 show one of my compound magnets, consisting of six sets of permanent magnets arranged to form a box or case with three compartments. Fig. 10 is an elevation of one of my compound magnets held together by the hoops.

My invention is a compound permanent magnet, the elements being in the form of a case with the opposite poles on opposite sides or ends of the casings—that is to say, a compound magnet composed of at least two permanent magnets, with like pole to like pole, and secured together in that position to form four walls of a box, so that by adding a top and bottom or end pieces a complete box or case is made.

In the drawings, A A' A² A³, &c., represent single permanent magnets, each so shaped that it will form a portion of the walls of a box or case. The magnets shown are, in fact, formed of cast-iron, that being the material I prefer, for the reason that I can readily give the desired shape to each magnet; but the magnets may be made in the usual way, except that great care is required in the manufacture of permanent magnets from steel, in order to make them fit for use in the manufacture of my compound magnets.

A minor feature of my invention consists in a compound magnet whose elements are secured together by a hoop or band.

In Fig. 1 a single band, B, of metal is shown; in Fig. 2 two bands, B B'; in Figs. 7 and 9 a single band, B, and in Fig. 10 three bands. In Fig. 1 the magnets A and A³, which together constitute a circular frame or case, are first inserted in the hoop B, then the magnets A' and A⁴, (the latter not shown, but just like A' in shape and size,) and then the magnets A² and A⁵, and all the magnets are then firmly connected together by the bolts $d$ $d$ and clamping-plates $ff$. G is a cover.

In Fig. 2 the magnets A A' are held together by the hoops B B'.

In Figs. 7, 8, 9, and 10 the magnets are held together substantially as in Fig. 1.

In all the figures the exterior of the compound magnet forms the exterior of the box or case, and is made ornamental by moldings $a$, showing a carved surface or other designs; and this is an important feature of my invention, as it enables me to make the case of greater commercial value, and also adds to the magnetic strength, besides stiffening and strengthening the separate magnets of which the case is built, when the magnets are made thin to form a shell.

Fig. 9 is a central lengthwise section through Fig. 7. Fig. 8 is a top view of the upper magnets, A', A², A³, A⁴, A⁵, and A⁶, and Fig. 7 is a top view of the base-magnets, A⁸ to A¹³—that is, Fig. 7 shows the compound magnet which is shown in section in Fig. 9, with the magnets A' to A⁷, inclusive, removed, there being twelve intermediate magnets, each like all the others, and each marked A⁷. These figures illustrate somewhat the scope of my invention, a compound permanent magnet which not only furnishes the magnetism required, but is also a box or case, and which obviously may therefore be made in an almost endless number of forms, for my compound magnet is applicable for all instruments in which a permanent magnet in a box or case has heretofore been used.

The several permanent magnets of which my magnetic box or case is built up may be cemented together, and may be recessed to receive the top and bottom or end pieces. In Fig. 1 the end pieces, *f f*, are held in recesses in the compound magnet by means of the screws *d d*. In Fig. 2 the recesses in the compound magnet are so formed as to hold the end pieces, *f f*, in place. In Fig. 9 the lower end piece may obviously in some cases be dispensed with, and the screws *d* be screwed into the back board, which will then be the lower end piece.

My magnetic box or case is mainly useful as a receptacle to contain the armature and the means for operating it for a magneto-machine, but is of course applicable for other uses.

What I claim as my invention is—

1. In combination, a series of permanent magnets with their like poles together, arranged to form the main walls of a receptacle, as set forth.

2. A receptacle built up of permanent magnets, two or more of which are formed with moldings *a a*, of magnetic material, as set forth.

3. In combination, a series of permanent magnets arranged to form the main walls of a box or case, with non-magnetic end pieces attached to the compound magnet to form a complete box, substantially as set forth.

WILLIAM HUMANS.

Witnesses:
JOHN R. SNOW,
J. E. MAYNADIER.